United States Patent
Day et al.

(10) Patent No.: US 10,052,847 B2
(45) Date of Patent: *Aug. 21, 2018

(54) METHOD FOR PROMOTING ELECTRICAL CONDUCTION BETWEEN METALLIC COMPONENTS AND COMPOSITE MATERIALS

(71) Applicant: The Boeing Company, Chicago, IL (US)

(72) Inventors: Arthur C. Day, Seattle, WA (US); Carl Roy McIver, Everett, WA (US); Dejan Nikic, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/268,339

(22) Filed: Sep. 16, 2016

(65) Prior Publication Data

US 2018/0079172 A1    Mar. 22, 2018

(51) Int. Cl.
*B32B 3/00*    (2006.01)
*B32B 7/14*    (2006.01)
(Continued)

(52) U.S. Cl.
CPC .............. *B32B 7/14* (2013.01); *B32B 27/20* (2013.01); *C09D 5/24* (2013.01); *C09D 11/52* (2013.01);
(Continued)

(58) Field of Classification Search
CPC ........ B32B 7/12; B32B 27/20; B32B 2605/18
See application file for complete search history.

(56) References Cited

U.S. PATENT DOCUMENTS 6,000,977 A    12/1999  Haake
6,137,083 A    10/2000  Bost et al.
(Continued)

FOREIGN PATENT DOCUMENTS

DE    102013215713    12/2014
WO    9511129         4/1995
WO    2008048705      4/2008

OTHER PUBLICATIONS

Mulazimoglu, H., et al., "Recent Developments in Techniques to Minimize Lightning Current Arcing Between Fasteners and Composite Structure", International Conference on Lightning and Static Electricity, 2011 . https://www.alcoa.com/fastening_systems_and_rings/aerospace/en/pdf/hasim_icosle_2011.pdf.
(Continued)

*Primary Examiner* — Elizabeth E Mulvaney
(74) *Attorney, Agent, or Firm* — Gates & Cooper LLP

(57) ABSTRACT

A method for promoting electrical conduction between metallic components and composite materials. A composite body is coated with an adhering layer comprising a conductive material, and a metallic component is electrically connected to the conductive material of the adhering layer, when the metallic component is coupled to the composite body. The adhering layer is deposited inside a hole in the composite body, and/or along an edge of the hole, and/or on at least a portion of a surface of the composite body. The composite body is a structure of an aircraft or other vehicle comprised of composite materials formed from carbon fiber-reinforced polymers (CFRPs), the metallic component is a fastener or is positioned at an interface between the fastener and the composite body, and the electrical connection is made as part of a lightning protection system, an electro-
(Continued)

magnetic effects (EME) management system, or grounding system.

20 Claims, 6 Drawing Sheets

(51) Int. Cl.
*B32B 27/20* (2006.01)
*C09D 11/52* (2014.01)
*C09D 5/24* (2006.01)

(52) U.S. Cl.
CPC ..... *B32B 2255/10* (2013.01); *B32B 2262/106* (2013.01); *B32B 2307/202* (2013.01); *B32B 2605/18* (2013.01)

(56) References Cited

U.S. PATENT DOCUMENTS

| 6,868,314 | B1 | 3/2005 | Frink |
| 7,391,622 | B2 | 6/2008 | Marshall et al. |
| 2006/0275660 | A1 | 12/2006 | Zama et al. |
| 2007/0154634 | A1 | 7/2007 | Renn |
| 2010/0151214 | A1 | 6/2010 | Cawse |
| 2012/0111614 | A1 | 5/2012 | Free |

OTHER PUBLICATIONS

Yoon, S. H., et al., "Sintering and Consolidation of Silver Nanoparticles Printed on Polyimide Substrate Films", Macromolecular Research, vol. 17, No. 8, pp. 568-574, 2009.
Novacentrix Metalon HPS-DEV ink, last accessed May 17, 2016. http://store.novacentrix.com/HPS_021LV_silver_screen_print_ink_p/hps-dev.htm.
Schroder, K. A., et al., "Broadcast Photonic Curing of Metallic Nanoparticle Films", NSTI-Nanotech 2006, vol. 3, 2006. http://www.novacentrix.com/sites/default/files/pdf/Schroder-NSTI-2006.pdf.
Schroder, K. A., "Mechanisms of Photonic Curing: Processing High Temperature Films on Low Temperature Substrates", last accessed Sep. 16, 2016. http://www.novacentrix.com/sites/default/files/pdf/Schroder-NSTI-2011.pdf.
Perelaer, J., et al., "Ink-jet Printing and Microwave Sintering of Conductive Silver Tracks", Adv. Mater. Jul. 2006, 18, pp. 2101-2104. https://www.researchgate.net/publication/228031694_Ink-Jet_Printing_and_Microwave_Sintering_of Conductive_Silver_Tracks.
Luo, S., et al., "Effect of UV/Ozone Treatment on Surface Tension and Adhesion in Electronic Packaging", IEEE Transactions on Components and Packaging Technologies, vol. 24, No. 1, pp. 43-49, Mar. 2001.
West, J., et al., "Photonic Sintering of Silver Nanoparticles: Comparison of Experiment and Theory", from the book titled "Sintering—Methods and Products", (2012), ISBN: 978-953-51-0371-4, InTech. http://cdn.intechopen.com/pdfs/33167/InTech-Photonic_sintering_of silver_nanoparticles_comparison_of experiment_and_theory.pdf.
Hwang, H., et al., "All-photonic drying and sintering process via flash white light combined with deep-UV and near-infrared irradiation for highly conductive copper nano-ink", Scientific Reports 6, Article No. 19696 (2016).
Extended European Search Report dated Feb. 9, 2018 for European Patent Application No. 17187323.5.
Extended European Search Report dated Feb. 16, 2018 for European Patent Application No. 17185102.5.

METHOD FOR PROMOTING ELECTRICAL CONDUCTION BETWEEN METALLIC COMPONENTS AND COMPOSITE MATERIALS

CROSS REFERENCE TO RELATED APPLICATION

This application claims the benefit under 35 U.S.C Section 119(e) of the following co-pending and commonly-assigned application:

U.S. Utility application Ser. No. 15/268,357, filed on Sep. 16, 2016, by Carl R. McIver, Dejan Nikic and Arthur C. Day, entitled "METHOD FOR PLACING ELECTRICAL CONDUCTORS INTERIOR TO A COMPOSITE STRUCTURE PRIOR TO CURING,";

which application is incorporated by reference herein.

BACKGROUND INFORMATION

1. Field

The invention is related generally to a method for promoting electrical conduction between metallic components and composite materials.

2. Background

Lightning protection and electromagnetic effects (EME) management systems are used in aircraft to prevent arcing or sparking in or near fuel tanks, and electrical damage to other components of the aircraft. Such systems not only dissipate lightning strikes, they provide for electrical shielding, grounding and surge suppression.

In the past, most aircraft were comprised of aluminum, which conducts electricity very well. However, modern aircraft use advanced composite materials, such as carbon fiber-reinforced polymers (CFRPs), which are much less conductive. Consequently, conductive paths must be designed for use with such materials to carry electrical currents.

It is desirable that any solutions to these problems with composite materials be provided at a low cost and with a low weight impact. For example, current practice is to use sleeved fasteners with the composite materials. However, sleeved fasteners are very expensive to purchase and use, and involve many inspections during installation and repair.

Moreover, the use of metallic fasteners in CFRP structures often also involves the use of sealant and seal caps, for example, for lighting protection of wings. The extensive use of sealant not only adds cost and factory flow time, but is proving to be unpopular with customers.

It would be preferable to use clearance-fit fasteners with composite materials. However, clearance-fit fasteners normally provide poor electrical contact to drilled holes in composite materials, which results in arcs and sparks.

Conductive paints have been proposed in the past as a way to improve the electrical conductivity for external surfaces of composite structures. However, past attempts to use particle-laden paints have been unsuccessful, due to their modest conductivity and difficulties in their application.

Another solution that has been proposed is the use of liquid metals (i.e., liquid at or near room temperature) to fill the space between a conventional fastener and a hole in the composite materials. However, liquid metals tend to form brittle intermetallic compounds with titanium and other structural metals, which could severely degrade a fastener's mechanical properties.

What is needed, then, is a solution that promotes electrical conduction between metallic components and composite materials, particularly at fastened joints or where systems are to be electrically bonded to the main structure.

SUMMARY

To overcome the limitations in the prior art described above, and to overcome other limitations that will become apparent upon reading and understanding the present specification, the present invention discloses a method, apparatus and article of manufacture for promoting electrical conduction between metallic components and composite materials.

In one embodiment, a composite body is coated with an adhering layer comprising a conductive material, and a metallic component is electrically connected to the conductive material of the adhering layer, when the metallic component is coupled to the composite body. The composite body is a structure of an aircraft or other vehicle comprised of composite materials formed from carbon fiber-reinforced polymers (CFRPs), the metallic component is a fastener or is a sleeve, washer or other element positioned at an interface between a fastener and the composite body, and the metallic component electrically connected to the conductive material of the layer forms part of a lightning protection system, an electromagnetic effects management system, or grounding system.

The adhering layer comprises at least one of an electrically conductive ink or electrically conductive paint, wherein the electrically conductive ink or electrically conductive paint is comprised of a plurality of particles including at least one of copper or silver in a formulation including low temperature sintering agents. The electrically conductive ink or electrically conductive paint is applied on the composite body using at least one of screen-printing, ink-jet printing, intaglio, dry film transfer, metallization, or plating.

The electrically conductive ink or electrically conductive paint may also include titanium, wherein the titanium promotes adhesion to carbon fibers of the composite body by converting a thin surface layer of the carbon fibers to a titanium carbide (TiC), and the particles form a thicker adherent layer on top of the TiC.

The adhering layer coating the composite body is cured at a temperature that does not adversely affect the composite body. In one embodiment, this temperature is between about 100° C. and about 200° C.

When the adhering layer is applied into a hole in the composite body, in-situ curing of the adhering layer is performed by at least one of baking, flash radiant heating, or laser heating. The in-situ curing of the adhering layer may also be performed by electrical inductive heating when the metallic component is inserted into the hole.

DRAWINGS

Referring now to the drawings in which like reference numbers represent corresponding parts throughout:

DETAILED DESCRIPTION

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Structure Description

In one embodiment, electrical conduction is promoted between metallic components and composite materials. The metallic components and composite materials are used in aircraft and aerospace vehicles, structures, and applications, and the electrical conduction thus promoted improves the function of lightning protection systems, electromagnetic effects management systems, or grounding systems.

Figure 1:
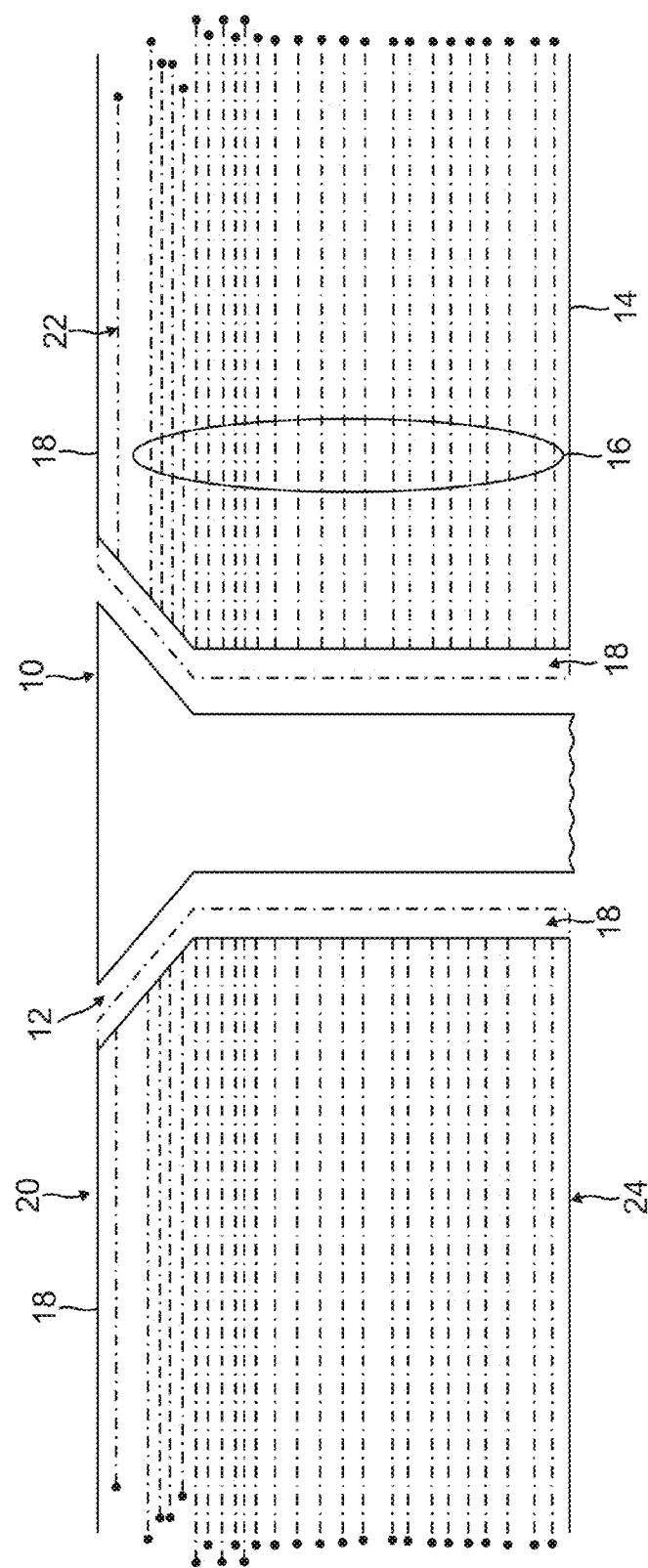
FIG. 1 is a cross-sectional view illustrating a structure, according to one embodiment.

FIG. 1 is a cross-sectional view illustrating a structure according to one embodiment, which includes a metallic component 10 inserted into a hole 12 drilled into a composite body 14 comprised of composite materials. In one embodiment, the metallic component 10 is a fastener and the composite body 14 is a CFRP, wherein the orientation of the fibers in the CFRP are indicated by the dashed lines 16. In another embodiment, the metallic component 10 comprises a sleeve, washer or other element positioned at an interface between a fastener and the composite body 14.

An adhering layer 18 is selectively deposited inside the hole 12 in the composite body 14, and/or along an edge of the hole 12 in the composite body 14, and/or on at least a portion of a surface 20 of the composite body 14. The adhering layer 18 comprises a layer of electrically conductive material, such as an ink or paint, that is loaded with a plurality of conducting particles. These conducting particles will typically be nanoparticles or microparticles, such as copper (Cu) or silver (Ag), embedded in, or in solution with, a carrier, such as grease, epoxy, resin, solvent, or other material, that also may include low-temperature sintering agents.

Compositions for use as layer 18 include commercially available inks or paints for printed electronics that can be applied by several processes, including screen-printing and ink-jet printing. Experiments have included both GC Electronics Silver Print II™, a 60% microparticle silver/resin paint, and Novacentrix Metalon HPS-DEV™, a 90% nanoparticle silver ink. For purposes of comparison, the microparticle silver/resin paint has a typical resistivity of 10e-3 ohm-cm, while the nanoparticle silver ink has a typical resistivity of generally 10e-5 ohm-cm or better, in their deposited and sintered forms. Experimental results indicate that the nanoparticle silver ink was more satisfactory than the microparticle silver/resin paint.

After application, microparticle paints typically do not require a curing step, other than time. However, nanoparticle inks typically require drying and curing steps, where the inks are warmed for a period, which drives off any non-silver products, such as stabilizers, carrier agents or surface oxides.

Curing is defined as the temperature and time environment sufficient to cure the ink and may or may not be sufficient to sinter the metallic constituents of the ink. The curing step is where the metallic particles are joined to themselves and bond with the composite body 14. The curing step can entail at least one of baking, induction heating, laser heating, flash radiant heating or photonic sintering.

Most curing steps of similar materials or processes require temperatures that would damage the carbon/epoxy in the composite body 14, but the layer 18 can be processed at low temperatures between about 100° C. and about 200° C. to yield a highly conductive material without damaging the composite body 14. (Many CFRP systems in common use have an epoxy resin matrix which is not stable at temperatures much above a cure temperature of 177° C.)

Also, these low temperatures mean that conducting particles in layer 18 are generally not taken near their melting points, essentially eliminating intermetallic formation. The optional use of photonic curing, which may cause very brief (millisecond) melting of the deposited metal ink, should also minimize intermetallic formation.

The result is a structure that enables high conductivity between the metallic component 10 and the layer 18, without damaging the composite body 14. In one embodiment, the composite body 14 is a structure of an aircraft or other vehicle, and the metallic component 10, when electrically connected to the conductive material of the adhering layer 18, forms part of a lightning protection system. The lightning protection system includes a lightning mesh 22 or other electrically conducting structure underneath surface 20 of the composite body 14, e.g., an outside surface, while an opposite surface 24 of the composite body 14, e.g., an inside surface, is a surface of, or a surface adjacent to, a fuel tank (not shown). The conductive material in layer 18 deposited inside the hole 12 in the composite body 14, and/or along the edge of the hole 12 in the composite body 14, and/or on at least a portion of a surface 20 of the composite body 14, substantially improves electrical contact between the metallic component 10 and the lightning mesh 22, when the metallic component 10 is inserted into the hole 12 and coupled to the composite body 14.

Coating Description

Figure 2:
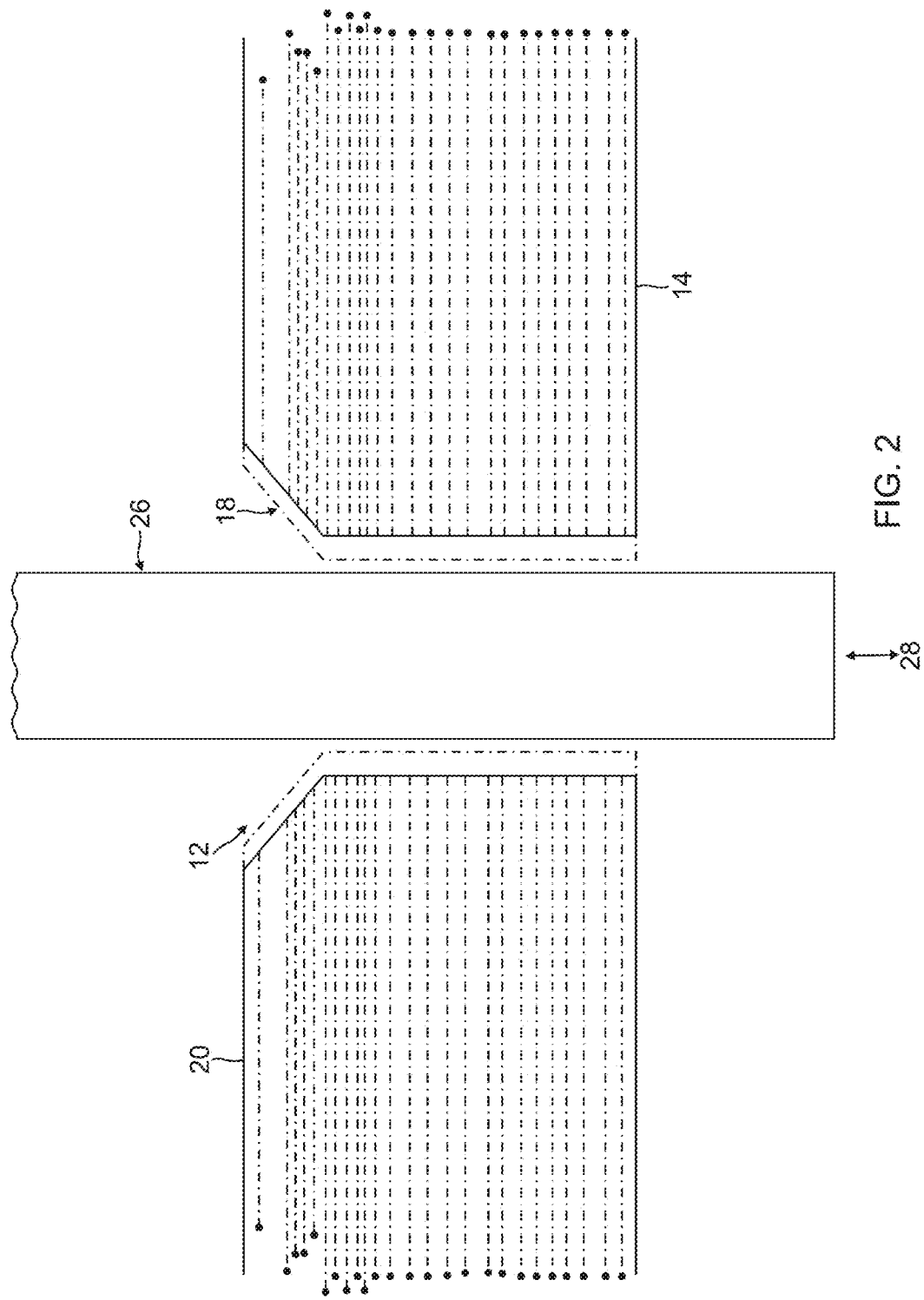
FIG. 2 is a cross-sectional view illustrating how an adhering layer is applied to composite body, according to one embodiment.

FIG. 2 is a cross-sectional view illustrating how the layer 18 is applied to the composite body 14, according to one embodiment. In this embodiment, an applicator 26, such as an ink-jet printer, is inserted into the hole 12 in the composite body 14, and a reciprocating linear motion 28 of the applicator 26 is used to deposit the layer 18 inside the hole 12. The applicator 26 may also be used to deposit the layer 18 along the edge of the hole 12 in the composite body 14 and/or on the surface 20 of the composite body 14, although other applicators may be used as well.

Curing Description

Figure 3:
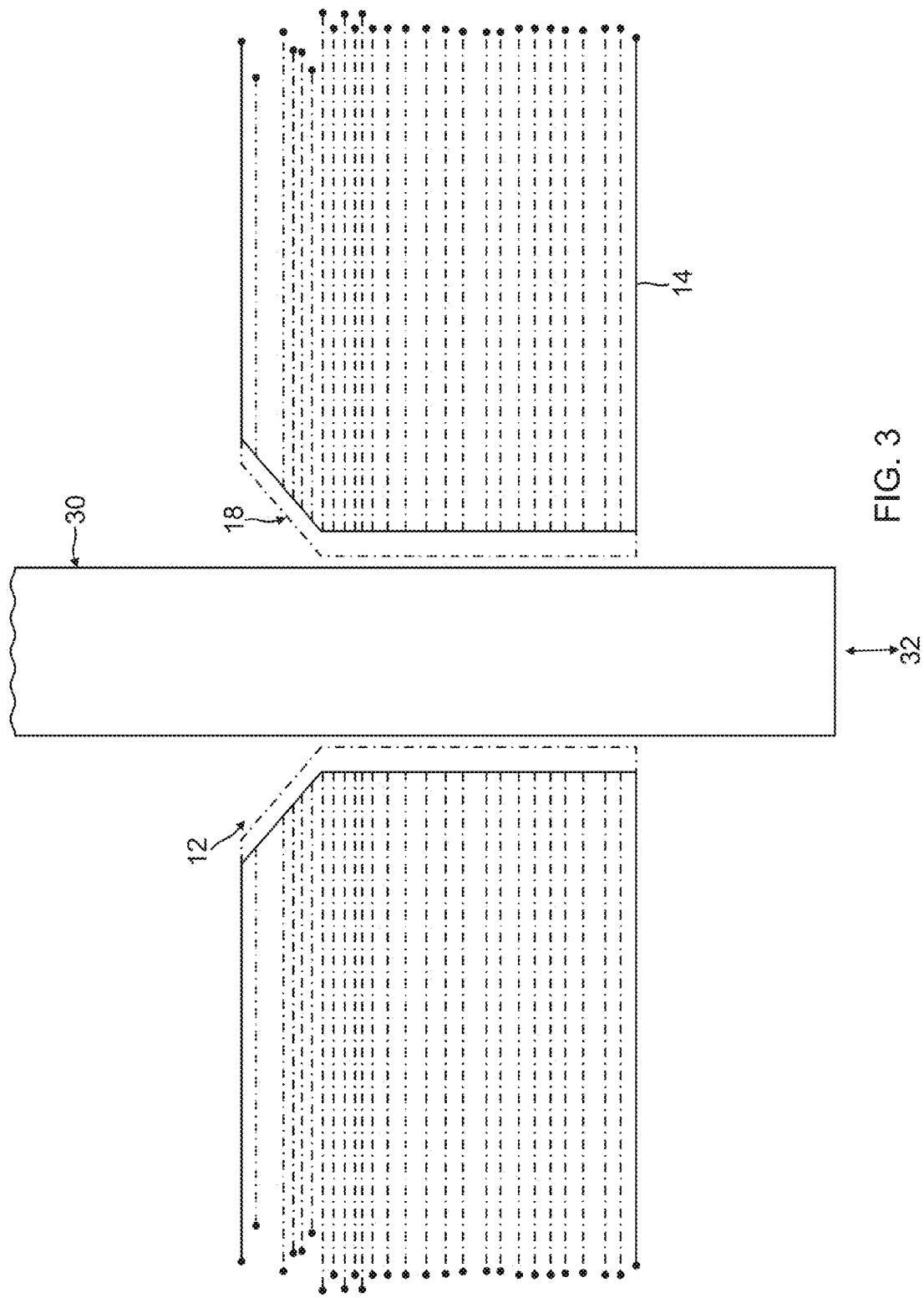
FIG. 3 is a cross-sectional view illustrating how an adhering layer is cured, according to one embodiment.

FIG. 3 is a cross-sectional view illustrating how the layer 18 is cured, according to one embodiment. In this embodiment, a curing device 30, such as a light pipe, is inserted into the hole 12 in the composite body 14, and a reciprocating linear motion 32 of the curing device 30 is used to cure the layer 18 inside the hole 12. The curing device 30 may also be used to cure the layer 18 along the edge of the hole 12 in the composite body 14 and/or on the surface 20 of the composite body 14, although other curing devices may be used as well. This in-situ curing, e.g., within the hole 12 in the composite body 14, provides local heat exposure.

Fabrication Process Description

Figure 4:
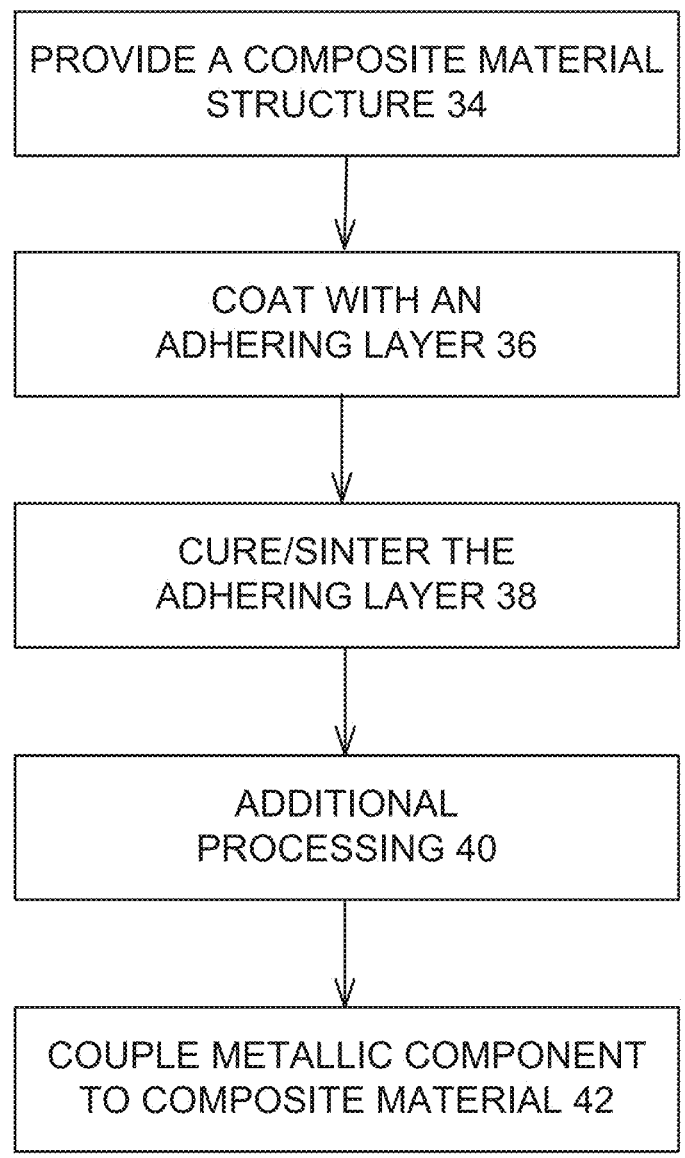
FIG. 4 is a flowchart illustrating a fabrication process, according to one embodiment.

FIG. 4 is a flowchart illustrating a fabrication process according to one embodiment.

Block 34 represents the step of providing a structure comprised of the composite body 14, wherein the composite body 14 includes the hole 12 for the metallic component 10, which has been prepared for the coating step. Note that various surface, hole and hole edge treatments may be performed in or prior to this step.

Block 36 represents the step of coating the composite body 14 with the adhering layer 18, by selectively depositing the layer 18 inside the hole 12 in the composite body 14, and/or along the edge of the hole 12 in the composite body 14, and/or on at least a portion of a surface 20 of the composite body 14. Any suitable material transfer method could be used for this step, including screen-printing, ink-jet printing, intaglio, dry film transfer, metallization, plating, and others.

Block 38 represents the step of performing in-situ curing of the adhering layer 18. For example, curing may compact the metallic nanoparticles of the layer 18, as well as solidifying and hardening the layer 18, using heat, light and/or pressure. The curing step may be chemically enhanced or thermal, and would typically be comprised of either slow thermal baking or induction heating at a temperature determined by the composition of the layer 18 and interaction of the composite body 14 and layer 18, or laser heating or flash radiant heating, typically using broad spectrum light, with characteristics determined by hole 12 geometry, layer 18 composition, and interaction of the composite body 14 and the layer 18.

Block 40 represents the step of additional processing, if any. For example, if additional sizing of the hole 12 is required after depositing the layer 18, appropriate tools are employed as necessary.

Block 42 represents the step of installing the metallic component 10 into the hole 12 and coupling the metallic component 10 to the composite body 14. Normal fastening processes may be used. The metallic component 10 is electrically connected to the conductive material of the layer 18, when the metallic component 12 is coupled to the composite body 14.

In another embodiment, the metallic component 10 is installed into the hole 12 before in-situ curing is performed. Specifically, the in-situ curing of the adhering layer 18 is performed by electrical inductive heating when the metallic component 10 is inserted into the hole 12 of the composite body 14.

The above process steps may be used for any number of different applications or treatments. For example, these applications or treatments may include the following:

- The deposition of layer 18 in the hole 12 provides a sleeve for electrical conductivity purposes, such as electromagnetic effects and lightning protection systems.
- The deposition of layer 18 in the hole 12 provides a sleeve for structural purposes (may be combined with EME purposes).
- The deposition of layer 18 in the hole 12 (with either a complete or partial hole 12 inner surface treatment) provides an electrical connection between the fastener 10 and the lightning mesh 22.
- The deposition of layer 18 on the surface 20 provides an electrical connection between the fastener 10 and the surface 20.
- The deposition of layer 18 on the surface 20, hole 12 edge and hole 12 inner surface provides an electrical connection from one side of the composite body 14 to the other side of the of the composite body 14 using the hole 12 treatment as an electrical via or pathway.
- Edge treatments for the hole 12 may include coating exposed edges with layer 18 for lightning protection, conductivity enhancement, and other treatments similar to hole 12 treatments, and using similar methods. In addition, deposition of the layer 18 at an edge of the hole 12 could eliminate edge glow sparking.

Repair treatments could comprise replacement or repair of any of the above treatments, as well as electrical repair of the lightning protection mesh 22.

Examples of Aircraft and Methods of Fabricating and Operating Aircraft

Figure 5:
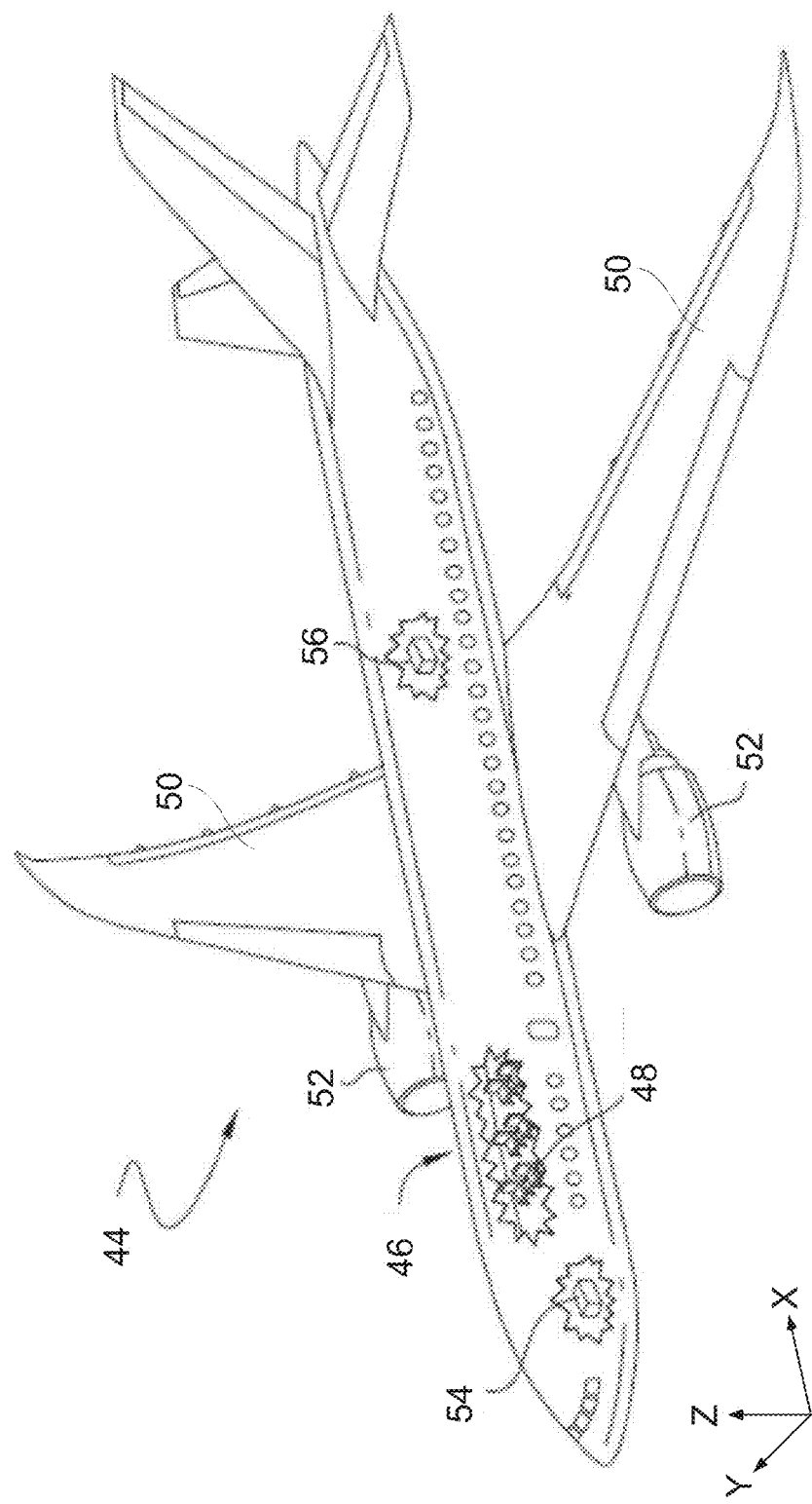
FIG. 5 is a schematic illustration of aircraft, in accordance with some embodiments.

To better understand various aspects of implementation of the described systems and techniques, a brief description of an aircraft and aircraft wing is now presented. FIG. 5 is a schematic illustration of aircraft 44, in accordance with some embodiments. As depicted in FIG. 5, aircraft 44 is defined by a longitudinal axis (X-axis), a lateral axis (Y-axis), and a vertical axis (Z-axis). In various embodiments, aircraft 44 comprises airframe 46 with interior 48. Aircraft 44 includes wings 50 coupled to airframe 46. Aircraft 44 may also include engines 52 supported by wings 50. In some embodiments, aircraft 44 further includes a number of high-level systems such as electrical system 54 and environmental system 56. In other embodiments, any number of other systems may be included.

Although an aerospace example is shown, the principles disclosed herein may be applied to other industries, such as the automotive industry. Accordingly, in addition to aircraft 44, the principles disclosed herein may apply to other vehicles, e.g., land vehicles, marine vehicles, space vehicles, etc.

Figure 6:
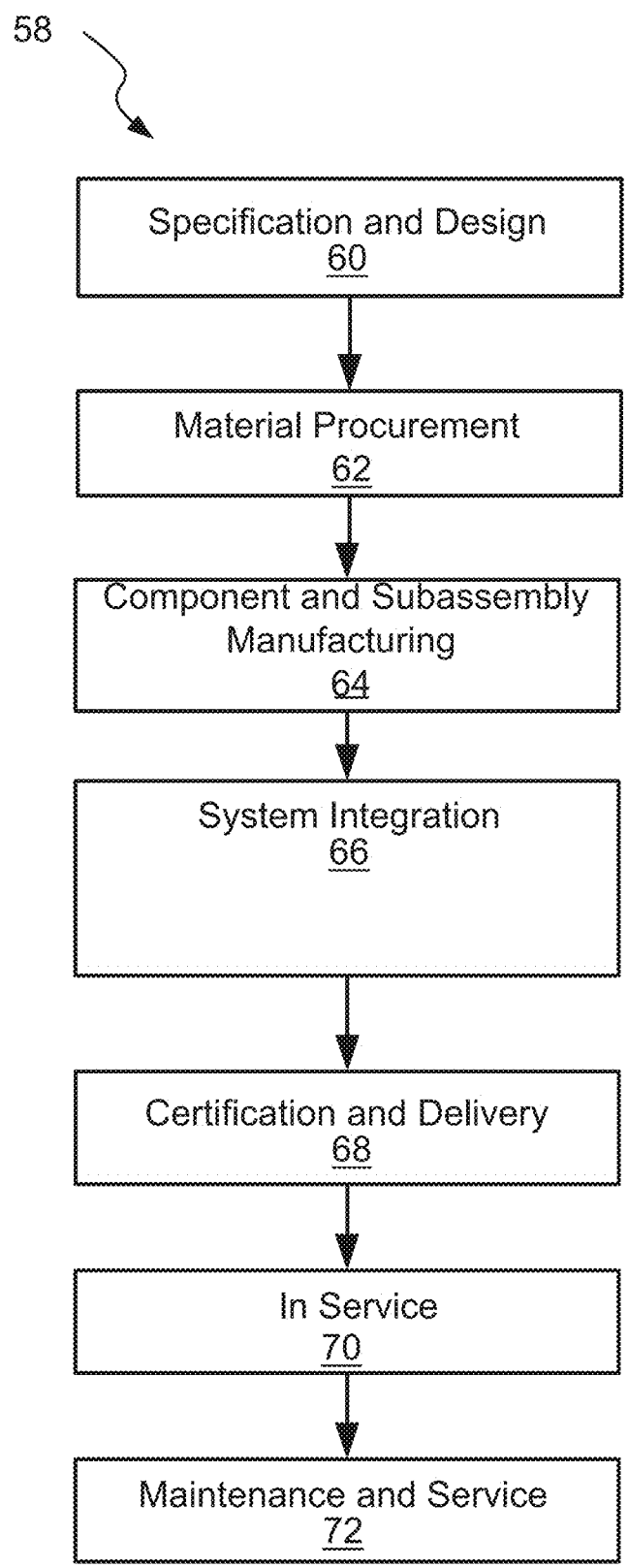
FIG. 6 is a flowchart illustrating an aircraft manufacturing and service method, in accordance with some embodiments.

Examples of the present disclosure may be described in the context of aircraft manufacturing and service method 58 as shown in FIG. 6 and aircraft 44 as shown in FIG. 5. During pre-production, illustrative method 58 may include specification and design (block 60) of aircraft 44 and material procurement (block 62). During production, component and subassembly manufacturing (block 64) and system integration (block 66) of aircraft 44 may take place. In some embodiments, component and subassembly manufacturing (block 64) and system integration (block 66) may occur concurrently. For example, as various components and/or subassemblies complete manufacturing in block 64, they may be integrated into the aircraft at block 66 while other components and/or subassemblies are being manufactured in block 64. Described systems, methods, and assemblies formed by these methods, can be used in any of specification and design (block 60) of aircraft 44, material procurement (block 62), component and subassembly manufacturing (block 64), and/or system integration (block 66) of aircraft 44.

Thereafter, aircraft 44 may go through certification and delivery (block 68) to be placed in service (block 70). While in service (block 70), aircraft 44 may be scheduled for routine maintenance and service (block 72). Routine maintenance and service may include modification, reconfiguration, refurbishment, etc. of one or more inspection systems of aircraft 44. Described systems, methods, and assemblies formed by these methods, can be used in any of certification and delivery (block 68), in service (block 70), and/or maintenance and service (block 72).

Each of the processes of illustrative method 58 may be performed or carried out by a system integrator, a third party, and/or an operator (e.g., a customer). For the purposes of this description, a system integrator may include, without limitation, any number of aircraft manufacturers and major system subcontractors; a third party may include, without limitation, any number of vendors, subcontractors, and suppliers; and an operator may be an airline, leasing company, military entity, service organization, and so on.

Apparatus(es) and method(s) shown or described herein may be employed during any one or more of the stages of manufacturing and service method (illustrative method 58). For example, components or subassemblies corresponding to component and subassembly manufacturing (block 64) may be fabricated or manufactured in a manner similar to components or subassemblies produced while aircraft 44 is in service (block 70). Also, one or more examples of the apparatus(es), method(s), or combination thereof may be utilized during production stages (block 64) and (block 66), for example, by substantially expediting assembly of or reducing the cost of aircraft 44. Similarly, one or more examples of the apparatus or method realizations, or a combination thereof, may be utilized, for example and without limitation, while aircraft 44 is in service (block 70) and/or during maintenance and service (block 72).

Alternatives

The description of the embodiments set forth above has been presented for purposes of illustration and description, and is not intended to be exhaustive or limited to the embodiments described. Many alternatives, modifications and variations may be used in place of the specific elements described above.

The adhering layer 18 primarily provides electrical conductivity enhancements to the metallic component 10 and the composite body 14. However, the adhering layer 18 could also provide structural enhancements depending on the properties of the metallic component 10, the composite body 14, and the adhering layer 18.

Metallic particles and alloys other than Cu or Ag with Ti may be used in layer 18, and possible non-metallic enhancements (buffers, stabilizers, capping agents, etc.) may be used as well. Moreover, multiple metallic particle alloys may be combined or layered to provide specific enhancements to the final properties of the layer 18. However, it is expected that particles within the layer 18 typically cure, sinter, combine or aggregate at temperatures low enough not to damage the composite body 14, and at temperatures lower than the melting point of the metallic particles.

The layer 18 may also include formulations containing a small proportion of titanium (Ti) in addition to silver. The titanium can promote adhesion to carbon fibers by converting a thin surface layer of carbon to a titanium carbide (TiC). The highly conducting silver in the layer 18 will have less affinity for carbon, and so will form a thicker, but adherent, layer on top of the TiC.

Finally, although the description above is directed to aircraft and aerospace vehicles, structures, and applications, this invention is also applicable to other vehicles, structures, and applications. It is intended that the scope of the invention be limited not by this detailed description, but rather by the claims appended hereto.

What is claimed is:

1. A method for enhancing electrical conduction, comprising:
   coating a composite body with an adhering layer comprising a conductive material, wherein a metallic component is electrically connected to the conductive material of the adhering layer, when the metallic component is coupled to the composite body.

2. The method of claim 1, wherein the composite body is a structure of an aircraft or other vehicle comprised of composite materials formed from carbon fiber-reinforced polymers (CFRPs), the metallic component is a fastener, and the metallic component electrically connected to the conductive material of the adhering layer forms part of a lightning protection system, an electromagnetic effects (EME) management system, or grounding system.

3. The method of claim 1, wherein the metallic component comprises a sleeve, washer or other element positioned at an interface between a fastener and the composite body.

4. The method of claim 1, wherein the adhering layer comprises at least one of an electrically conductive ink or an electrically conductive paint.

5. The method of claim 4, wherein the electrically conductive ink or paint is comprised of a plurality of particles including at least one of copper or silver in a formulation including low temperature sintering agents.

6. The method of claim 5, wherein the electrically conductive ink or paint includes titanium, the titanium promotes adhesion to carbon fibers of the composite body by converting a thin surface layer of the carbon fibers to titanium carbide (TiC), and the particles form a thicker adherent layer on top of the TiC.

7. The method of claim 4, wherein the electrically conductive ink or paint is applied on the composite body using at least one of screen-printing, ink-jet printing, intaglio, dry film transfer, metallization, or plating.

8. The method of claim 1, further comprising curing the adhering layer coating the composite body at a temperature that does not adversely affect the composite body.

9. The method of claim 8, wherein the temperature is between about 100° C. and about 200° C.

10. The method of claim 8, wherein coating step further comprises depositing the adhering layer inside a hole in the composite body and the curing step further comprises performing in-situ curing of the adhering layer deposited inside the hole.

11. The method of claim 10, wherein the in-situ curing of the adhering layer is performed by at least one of baking, flash radiant heating, or laser heating.

12. The method of claim 10, wherein the in-situ curing of the adhering layer is performed by electrical inductive heating when the metallic component is inserted into the hole.

13. An apparatus for enhancing electrical conduction, comprising:
    a composite body coated with an adhering layer comprising a conductive material, wherein a metallic component is electrically connected to the conductive material of the adhering layer, when the metallic component is coupled to the composite body.

14. The apparatus of claim 13, wherein the composite body is a structure of an aircraft or other vehicle comprised of composite materials formed from carbon fiber-reinforced polymers (CFRPs), the metallic component is a fastener, and the metallic component electrically connected to the conductive material of the adhering layer forms part of a lightning protection system, an electromagnetic effects (EME) management system, or grounding system.

15. The apparatus of claim 13, wherein the metallic component is positioned at an interface between a fastener and the composite body.

16. The apparatus of claim 13, wherein the adhering layer comprises an electrically conductive ink or paint.

17. The apparatus of claim 16, wherein the electrically conductive ink or paint is comprised of a plurality of particles including copper or silver in a formulation including low temperature sintering agents.

18. The apparatus of claim 17, wherein the electrically conductive ink or paint includes titanium, the titanium promotes adhesion to carbon fibers of the composite body by converting a thin surface layer of the carbon fibers to titanium carbide (TiC), and the particles form a thicker adherent layer on top of the TiC.

19. An aircraft with enhanced electrical conduction, comprising:
- a composite body coated with an adhering layer comprising a conductive material; and
- a metallic component coupled to the composite body, wherein the metallic component is electrically connected to the conductive material of the adhering layer.

20. The aircraft of claim 19, wherein the composite body is a structure of the aircraft comprised of composite materials formed from carbon fiber-reinforced polymers (CFRPs), the metallic component is a fastener or is positioned at an interface between the fastener and the composite body, and the metallic component electrically connected to the conductive material of the layer forms part of a lightning protection system, an electromagnetic effects (EME) management system, or grounding system.

* * * * *